United States Patent [19]
Bitton et al.

[11] Patent Number: 6,052,737
[45] Date of Patent: Apr. 18, 2000

[54] COMPUTER SYSTEM, PROGRAM PRODUCT AND METHOD FOR DYNAMICALLY OPTIMIZING A COMMUNICATION PROTOCOL FOR SUPPORTING MORE USERS

[75] Inventors: Yosef Bitton; Randall Scott Nelson, both of Rochester, Minn.

[73] Assignee: International Business Machines Corporation, Armonk, N.Y.

[21] Appl. No.: 09/060,993

[22] Filed: Apr. 15, 1998

[51] Int. Cl.⁷ .............................. G06F 11/00; G06F 13/00
[52] U.S. Cl. ......................... 709/248; 709/228; 709/230; 709/250; 714/55; 714/708
[58] Field of Search ........................... 709/223, 227–228, 709/230, 236, 238, 242, 246, 248, 259; 714/48, 55, 700, 703, 707, 708

[56] References Cited

U.S. PATENT DOCUMENTS

| | | | |
|---|---|---|---|
| 5,442,637 | 8/1995 | Nguyen | 714/708 |
| 5,577,237 | 11/1996 | Lin | 713/500 |
| 5,638,517 | 6/1997 | Bartek et al. | 709/246 |
| 5,790,808 | 8/1998 | Seaman | 709/223 |

*Primary Examiner*—Zarni Maung
*Assistant Examiner*—Bharat Barot
*Attorney, Agent, or Firm*—Wood, Herron & Evans L.L.P.; Steven W. Roth

[57] ABSTRACT

A computer system, program product and method enhances the operation of a communications protocol by monitoring timers associated with the protocol to determine the transmission requirements placed on a transmit queue. The number of frames to be enqueued at a particular system tick is dynamically modified to prevent queue overload. In one embodiment the expiration of timers is adjusted to prevent queue overload. In another embodiment, frame transmission at timer expiry is adjusted to prevent queue overload.

25 Claims, 5 Drawing Sheets

COMPUTER SYSTEM, PROGRAM PRODUCT AND METHOD FOR DYNAMICALLY OPTIMIZING A COMMUNICATION PROTOCOL FOR SUPPORTING MORE USERS

FIELD OF THE INVENTION

This invention is generally related to computers and computer software, and more specifically is related to optimizing a communication protocol over a network for handling a greater number of users on the network.

BACKGROUND OF THE INVENTION

Computer technology continues to improve in the field of computer networks or networking. Networking refers generally to the scenario wherein several different remote computer users are electronically connected together to communicate with each other through the use of their computers. For example, computer networks are used to provide a direct communications link between users having a common interest, such as employees of a corporation. Such networks are generally referred to as local area networks (LAN) or wide area networks (WAN). More recently, large public networks, more commonly collectively known as the Internet, are being utilized by computer users to access and communicate with large numbers of remote users and other remote networks. Indeed, computers of all types and from all over the world are being connected together through appropriate networks. As a result, networking of an ever greater number of devices together over a LAN, WAN, or the Internet requires enhancement of existing networking capabilities to ensure proper, error-free communications.

The computer or computer devices connected together through a network can include any device that has the proper hardware and software to be compatible with the requirements of the network. Personal computers (PC's) or workstations are usually one of the more prevalent computer devices coupled to and used on a network. Within a LAN or WAN, a server might also be utilized. A server is essentially a computer that can be used by other personal computers or non-PC devices, such as a printer or disk drive, to further facilitate networking those devices together.

The various devices of the network must communicate with each other, and therefore, each device must be able to understand each other device, even though the devices have different functions or are made by different manufacturers. In order to allow the various network devices to communicate with each other, networks such as LANs and WANs use a common communications protocol which is shared by the various devices. A network communications protocol is a common set of hardware and software standards which must be implemented by the network devices so that they are linked together and can properly communicate or "talk" to each other and other devices over the network. Network protocols are developed by computer industry groups or individual manufacturers, and are widely accepted by various different manufacturers so that their products are network compatible and thus commercially marketable.

One such popular computer industry group that has developed a widely used network communications protocol is the Institute of Electrical and Electronics Engineers (IEEE). The IEEE has developed the IEEE 802.2 logical link control (LLC) network protocol, which is a software protocol used by the devices on a network to interface with other devices on the network, such as a LAN or WAN. Of course, other types of protocols may be used on the network along with the IEEE 802.2 protocol. One type of connection of the IEEE 802.2 protocol is a Type 2 connection, which uses a series of internal system timers, or protocol timers, to establish and maintain the communications connection (link) between two remote devices of a network that are using the protocol. Within the protocol, the devices are associated with link stations that are connected together by a logical connection or link. A link between two devices and their link stations is defined by the software associated with those devices. For example, the timers in the protocol are used to determine if a certain link station exists on the network, and are also used to establish that communications between two link stations are proceeding properly. During communications, the link stations send frames back and forth.

Each timer is made up of a series of system time segments or "ticks" which are usually generated by the operating system. For example, a link timer for the IEEE 802.2 protocol might comprise 30 system ticks. When a timer associated with a particular link "times out" or expires (i.e., the timer reaches its last tick), the device sends a data frame to the other device that it is talking to. By passing the data frames back and forth over the link, the remote devices (link stations) on the network talk to each other. As long as the station associated with the network link is able to transmit the data frames at the expiration of the timer, communications will proceed. However, if the network is not able to handle the amount of data to be transmitted upon the expiration of the timer or timers for the particular links of the network, problems in the communication procedure will occur.

Specifically, under the IEEE 802.2 protocol, at least one timer will typically be running for each link in the network, and that timer will be independent of the timers for the other links. Preferably, when the timer of a particular link expires, the frames associated with that link and that timer expiration will be transmitted or will otherwise be processed. Since the various links operate independently, there will be occasional excess or "burst" transmit demands to send frames over the network. The physical hardware port associated with a particular link may not be able to handle such burst data rates. Therefore, a data storage capability, referred to as a transmit queue, is used in combination with the IEEE 802.2 protocol for queuing the data frames until they can be handled. The queue for a typical LAN may be able to handle 8 to 64 data frames, for example, so that the frames may be properly sent in time. However, while the queue is able to handle certain burst transmit demands, it has a finite length and, under certain conditions, will also become full. When the queue is full, and a device tries to transmit a data frame, the data frame will be dropped and will not be transmitted. Dropped or lost data frames are not seen by the IEEE 802.2 protocol and thus cause problems.

As a more specific example, multiple links for a networked device will usually share or will be multiplexed through the same transmit queue. Therefore, multiple link timers corresponding to those multiple links will be associated with that queue. If all of the link timers expired at the same time (i.e., on the same system tick), the IEEE 802.2 protocol will attempt to transmit the frames associated with all of those link timers to the queue at the same time. Consequently, there is a burst of attempts to enqueue frames to the transmit queue. When the queue is full, the frames are dropped. When such frames are repeatedly dropped for a particular link station, the link station will eventually disconnect according to IEEE 802.2 protocol procedures. Such link station disconnection is undesirable and causes communication problems. Thus, the number of links which may be multiplexed by a device without disconnection is reduced by the possibility of such bursts occurring.

Therefore, a significant need exists for improving network communications. More specifically, a need exists with respect to handling the transmit queues in an IEEE 802.2 protocol environment to prevent undesirable disconnection between link stations. A need further exists for better handling of multiple timer expiries to increase the number of users and respective links on a multi-user device within the network.

SUMMARY OF THE INVENTION

The invention addresses the above-referenced problems and other problems associated with the prior art with a computer system, program product, and method, which enhances the operation of the transmit queue in cooperation with a communications protocol. More specifically, the various protocol timers associated with respective links in a network using an IEEE 802.2 protocol are monitored to determine their expiration times and thus to determine the frame transmission requirements to be placed on the system, and particularly on the transmit queue. By dynamically monitoring the timer expiration, the number of frames to be enqueued within a transmit queue is dynamically modified to prevent an overload of the queue and thus prevent frames from being undesirably dropped. In that way, the communication path between the links can be maintained to avoid any lost links within the network. Furthermore, the capacity of the network is increased such that it will be able to handle a larger number of links and respective users for a device within the network.

In accordance with one aspect of the present invention, the frame rate for enqueuing frames is dynamically adjusted by monitoring the operating system tick corresponding to the expiration of a protocol timer for a particular link and determining other timers expiring on that same system tick. When starting a new protocol timer, the expiry or expiration tick of that timer is determined. The actual number of other protocol timers expiring on that same operating system tick is determined and compared with a predetermined timer limit number. The timer limit number corresponds to a preset number reflective of the maximum transmit queue depth for the particular transmit queue utilized with the IEEE 802.2 protocol. The limit number is maintained as a count that can be dynamically adjusted as timers expire or are cancelled. If the actual number of timers expiring on the same operating system tick exceeds the timer limit number or count, then the new timer that is being started is set to expire on another operating system tick subsequent to the tick on which it was originally set to expire. Similarly, if the number of protocol timers expiring on the next subsequent operating system tick exceeds the timer limit number or count, then the new timer being started is set to expire on yet another subsequent operating system tick. Such processing occurs until an available operating system tick is found where the number of timers expiring thereon is less than the timer limit number.

In accordance with another aspect of the present invention, the data rate for the transmit queue is dynamically handled by monitoring the status of the transmit queue upon the expiration of a transmit timer. More specifically, the expiration of a protocol timer (timer expiry) is monitored and the corresponding expiry tick is determined. Upon timer expiry, the status of the transmit queue is checked to determine its depth. If the queue is not in a full state, the frames associated with the timer are processed on the operating system tick corresponding to expiry. However, if the queue is in a full state, then processing of the frames associated with the timer is delayed until a subsequent operating system tick. To ensure that the frames are processed in a timely fashion, the frames associated with the protocol timer which was delayed to a subsequent system tick are processed ahead of the other frames which are set to be processed on that same system tick.

In accordance with this aspect of the present invention, the transmit queue is monitored, rather than dynamically varying the expiration of a timer upon its creation. Many timers are often cancelled before expiration and, therefore, dynamically monitoring the status of the queue before modifying the timer expiry is efficient. The present invention adjusts the problem with burst data rates in the prior art and thus reduces the number of frames which are dropped, and thus reduces the loss of link stations of the network. The invention further increases the number of users and respective links that may be handled by a multi-user device. These features and other features of the invention are discussed in greater detail below in the Detailed Description of the invention which makes reference to the drawings to illustrate several embodiments of the invention.

BRIEF DESCRIPTION OF THE FIGURES

The accompanying drawings, which are incorporated in and constitute a part of this specification, illustrate embodiments of the invention and, together with a general description of the invention given below, serve to explain the principles of the invention.

DETAILED DESCRIPTION

Overall Hardware and Software for Networked Links Environment

Figure 1:
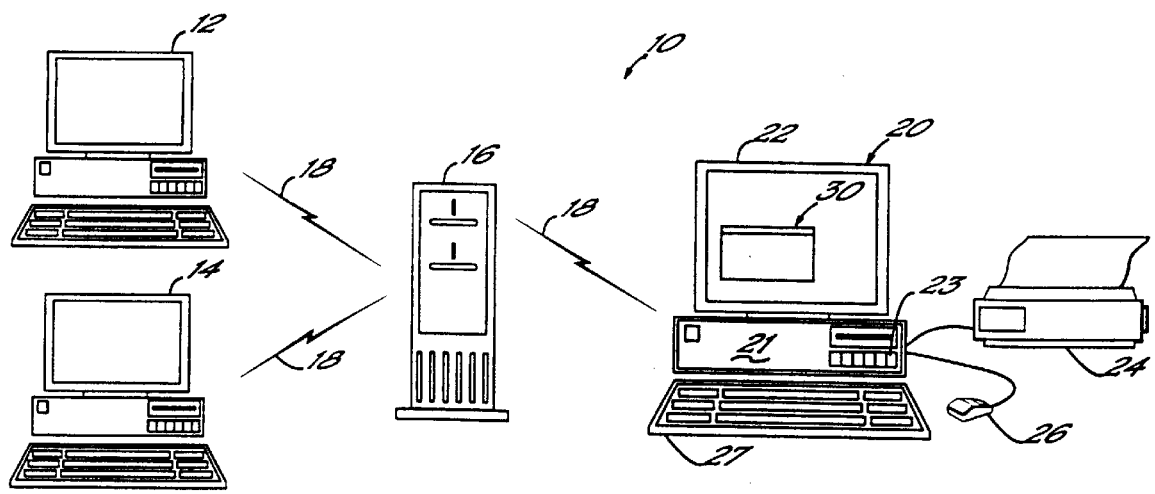
FIG. 1 is a schematic hardware diagram of a network environment consistent with the invention.

Turning to the Drawings, wherein like numbers denote like parts throughout the several views, a networked computer system 10 consistent with the invention is illustrated in FIG. 1. Computer system 10 includes one or more remote computer systems 12, 14 and 20 (e.g., desktop or personal computers, workstations, etc.) which may be associated with a server system 16 by logical connections or logical links (links) within network 18. The links made with server system 16 by 12, 14, and 20 are made through the network 18. The ends of a network link are termed "link stations."

There are one or more link stations associated with a device, such as device 20. Therefore, the devices in a network are thought of as link stations. The server system 16 itself is also associated with one or more link stations in the network. Network 18 may represent practically any type of networked interconnection, including but not limited to local-area networks (LANs), wide-area networks (WANs), wireless, and public networks (e.g., the Internet). The network 18 and links thereof are the focus of the invention; however, background illustration of the device link stations controlled by the network are helpful in illustrating the invention within its environment. Any number of computers and other user devices may be networked as link stations through network 18, e.g., through multiple servers. Server 16, for example, might be a link station in another, larger network (not shown) to couple link stations 12, 14, and 20 to other remote link stations (not shown). Furthermore, server 16 may itself be networked to a larger network, as discussed further below.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. The processor 21 will control the device link station or link stations through a communications protocol. A device on the network might also use a separate I/O processor for the protocol. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment. For example, each of the devices 12, 14, 16, and 20 and respective link stations coupled together through network 18 will execute programs for communicating or "talking" with each other over the network.

In general, the routines executed to implement the illustrated embodiments of the invention, whether implemented as part of an operating system or a specific application, program, object, module, communications protocol, or sequence of instructions will be referred to herein as "computer programs". The computer programs typically comprise instructions which, when read and executed by one or more processors 21 in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Furthermore, the invention applies regardless of the type of signal-bearing media used to establish the links on the network 18.

Those skilled in the art will recognize that the exemplary environment illustrated in FIG. 1 is not intended to limit the present invention. Indeed, those skilled in the art will recognize that other alternative hardware environments may be used without departing from the scope of the invention.

Figure 2:
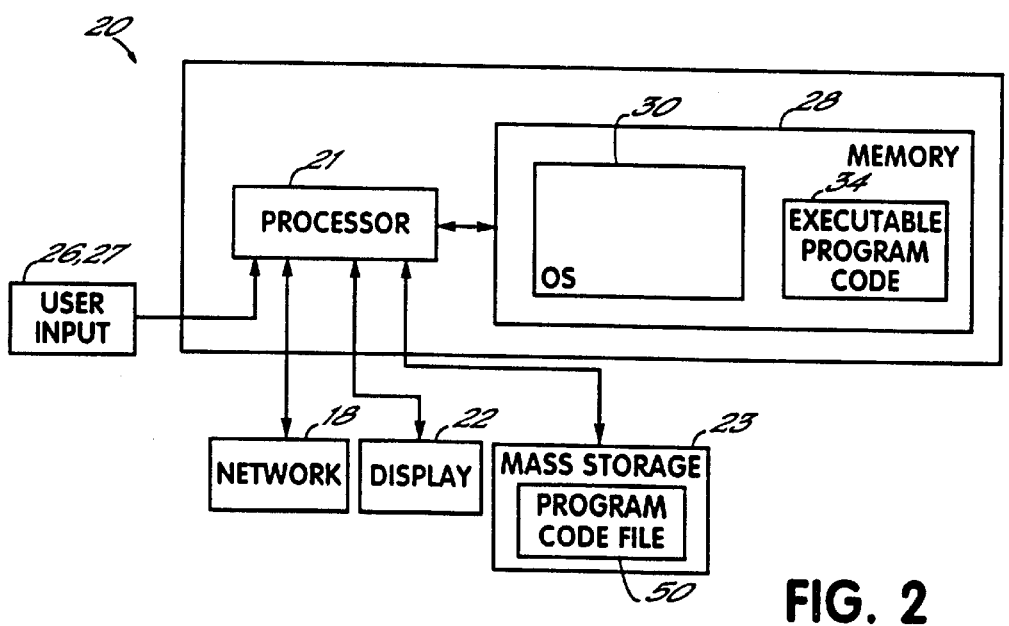
FIG. 2 is a block diagram of a networked device consistent with the invention.

FIG. 2 illustrates one suitable software environment for the link of computer system 20 consistent with the invention.

A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems or link stations in networked computer system 10 via the network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28, and is configured to execute program code on processor 21, e.g., executable program code 34, as well as to retrieve program code such as program code file 50 from mass storage 23 and/or network 18, among other operations. Furthermore, it should be appreciated that any of the operating system code, executable program code 34, and program code file 50 may, at different times, be resident in whole or in part in any of memory 28, mass storage 23, network 18, or within registers and/or caches in processor 21.

It should be appreciated that other software environments may be utilized in the alternative.

IEEE 802.2 Network Communications Protocol

Figure 3:
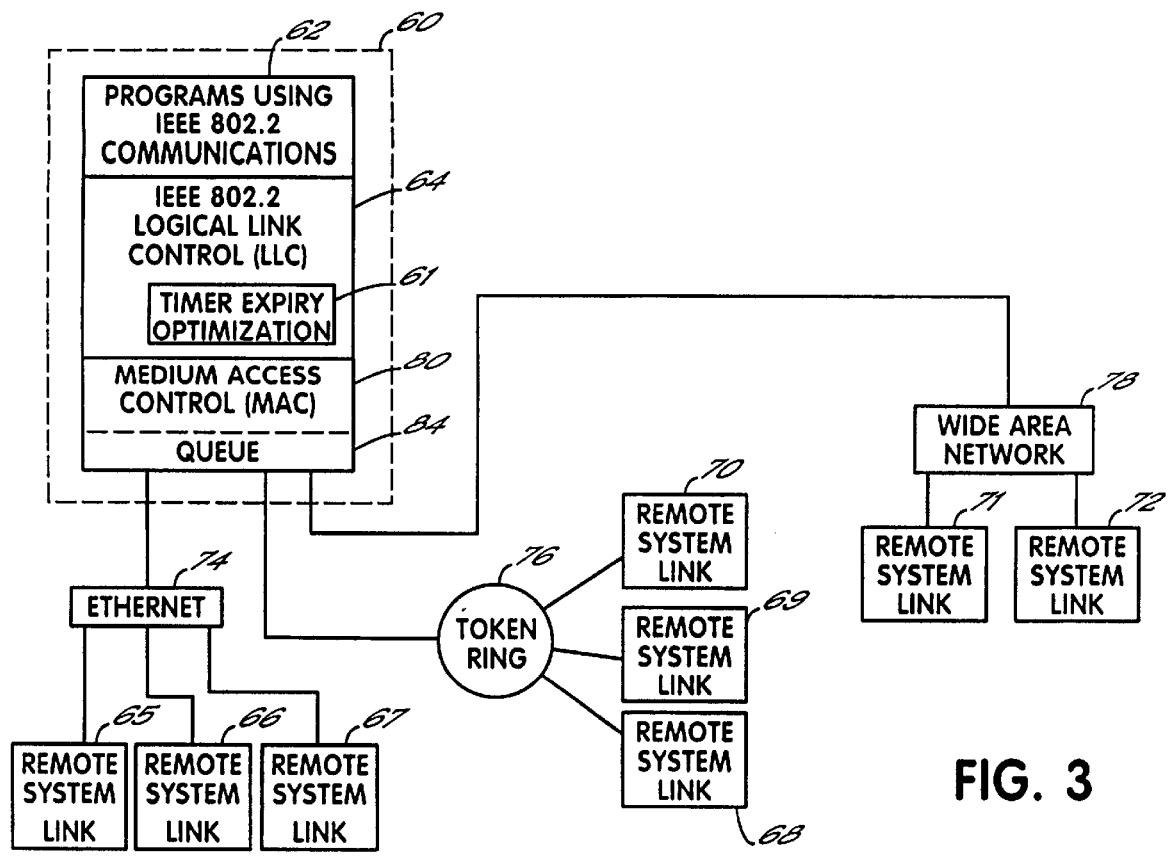
FIG. 3 is a block diagram of a network environment showing a communications protocol consistent with the present invention.

FIG. 3 illustrates a network environment utilizing the IEEE 802.2 logical link control (LLC) for providing device access to the network. Item 60 illustrates a system link station of a network and may be associated with any networkable device, such as a personal computer, utilizing programs 62 to provide access to the network through the IEEE 802.2 protocol. A device will have one or more link stations 60. The programs using IEEE 802.2 communications 62 will generally interface with an applications program (not shown), or other program of the device, associated with the particular network link station 60. Other programs might also be utilized in conjunction with programs 62 to provide access to the network through the IEEE 802.2 LLC 64. It will be understood by a person of ordinary skill in the art that manufacturers of different devices which are linked to the network will utilize different programs and software for network communication. The code utilized to practice the invention may be executed by the device processor and will reside as part of the IEEE 802.2 LLC 64 as TIMER EXPIRY OPTIMIZATION block 61.

The IEEE 802.2 LLC provides a common protocol between the various link stations of the network, such as link station 60 and remote link stations 65, 66, 67, 68, 69, 70, 71, and 72. Those various link stations are linked through a LAN, such as an Ethernet LAN 74, or a Token Ring LAN 76, or through a WAN 78. To provide the physical electrical communications between the various link stations and the networks, (i.e., to link the link stations) each link station will be provided with a software layer which operates the hardware necessary to make physical connection to one of the networks 74, 76, 78. With respect to a LAN, the layer is often referred to as a medium access control or MAC layer 80.

The medium access control (MAC) layer 80, provides access to a transmit queue 84 for use by the IEEE 802.2 LLC. As discussed in greater detail below, the transmit queue 84 has a suitable length for queuing data frames until they can be sent over the network. Oftentimes, the IEEE 802.2 LLC will produce burst transmission rates that exceed the transmit capability of the network or exceed the capabilities of the physical electrical port which couples the link station to the network. Therefore, the various frames must be queued until they can be sent on the network. A typical transmit queue length may be anywhere from 8 to 64 data frames. Furthermore, link station 60 may actually be a plurality of link stations associated with a device and multiplexed to the transmit queue 84, thus further increasing the number of frames to be handled by the queue.

Figure 4:
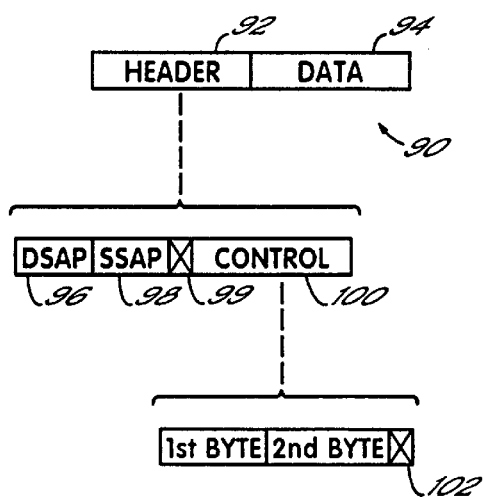
FIG. 4 is a frame schematic illustrative of frames transmitted using a communications protocol.

FIG. 4 illustrates a typical frame to be transmitted through the IEEE 802.2 protocol. The typical frame 90 includes a header field 92 and sometimes a data field 94 which contains the data to be transmitted through the various links on the network. The header field will include a one-byte destination service access point (DSAP) 96, and a one-byte source service access point (SSAP) 98. The least significant bit 99 of the two-byte field including DSAP 96 and SSAP 98, determines whether the data frame is considered a command frame which is transmitted from a source link or station, or whether it is a response frame from the destination link station responding to the command frame from the source link station. Generally, if bit 99 is a 0, the frame 90 is a command frame, and if it is a 1, the frame 90 is a response frame. The control field 100 of the header field 92 is a two-byte field which includes a least significant bit 102 utilized with the various timers within the IEEE 802.2 protocol, as discussed further herein below. Further specifics regarding frame 90 used with the IEEE 802.2 protocol are readily available from the IEEE, as will be readily understood by a person of ordinary skill in the art, and are not discussed herein in length except to the extent necessary to illustrate the invention to a person of ordinary skill in the art.

The IEEE 802.2 protocol utilizes Type 1 connections and Type 2 connections. The present invention is directed to optimizing a system utilizing IEEE 802.2 Type 2 connections. IEEE 802.2 Type 2 link connections utilize three separate timers T1, Ti, and T2. The timers ensure proper data flow over the network and timely responses between the link stations on the network. Each link between link stations will generally have one timer running for that link at all times. Furthermore, a large number of links may be multiplexed through a single transmit queue, such as queue 84 in FIG. 3. Therefore, a queue in the protocol will have to handle the large data transmission demands associated with the simultaneous expiration of a large number of multiplexed links. For example, each of the timers associated with the link stations 65, 66, 67, 68, 69, and 70 and respective links are multiplexed through the transmit queue 84 over the networks 74, 76 and 78. More specifically, when a particular timer associated with a link expires, the link will attempt to transmit a frame associated with the expiration of the timer for that link. As will be appreciated, if several links are multiplexed through the transmit queue 84 and their respective timers expire at the same time, there will be a burst of attempts to transmit data which may exceed the length of the transmit queue. If a timer-driven data frame is to be transmitted and there is no room left in the transmit queue, the frame will be locally dropped, unknown to the IEEE 802.2 LLC layer 64. If such data frames are repeatedly dropped, the link will eventually disconnect from the network, according to IEEE 802.2 protocol procedures.

An explanation of each of the IEEE 802.2 Type 2 timers will help to further understand the invention. The Reply Timer T1 is used by a source link station to detect the failure to receive the required acknowledgment or response from another destination link station. The source link station starts the reply timer T1 when it transmits a command frame to another link station, such as a poll command, to poll that link station to see if the station exists on the network. That is, the timer T1 is created to expire on a certain system tick. Referring to FIG. 4, the Poll command is established when the poll bit or least significant bit LSB 102 is ON (i.e. bit=1) within the control field 100 and the frame is a command frame (bit 99=0). In doing so, the source link station is requesting an acknowledgment from the other link station to acknowledge the Poll and establish whether that link station is within the network. If the source link station receives an acknowledgment from the other link, the station timer T1 is reset. A proper response frame or acknowledgment frame from the other link station could be indicated by bit 99=1 and the final bit or LSB 102 (also known as the Poll bit in a command frame) is on. Such a response frame from the link station indicates that it is responding to the poll. Other response frames may also be utilized according to the IEEE 802.2 protocol, such as a supervisory format, or S-format frame, which corresponds to the poll command frame which was sent. As mentioned, the reply timer T1 resets when the source link station receives a response to the poll from the other link station. However, if the T1 timer expires without a reply, the link station sends another command frame with the Poll bit 102=1, and starts another T1 timer. This polling process will continue for a pre-determined, user-configurable number of times after which the link station is disconnected if there is no reply from the destination link station. For example, the polling process might be executed 8 to 10 times before the link station is disconnected after it has not received a response or acknowledgment from the other link station.

As mentioned above, the timers associated with the IEEE 802.2 protocol are based upon operating system time segments or "ticks," which are generated by the operating system of the link. For example, a system tick may be 100 milliseconds (0.1 sec.) and the reply timer T1 might be a 1–3 second timer based upon numerous 100 millisecond ticks. The lengths of the reply timers T1 and other timers Ti and T2 are configurable according to a desired network protocol. When the timer reaches the last system tick, it expires. Such a condition is referred to as timer expiry.

The Inactivity Timer Ti is used to detect an inoperative condition in either the destination link station or within the network. To determine that the source link station detects such an inoperative condition, the inactivity timer Ti is used, and upon expiration of Ti the source link station will again poll the other remote link station. For example, if the source link station does not receive a frame during communication before the inactivity timer Ti expires, the source link station will solicit the status of the other link station utilizing a command frame with the Poll bit 122=1 (Poll command ON). The inactivity timer Ti might be utilized, for example, when the source link station has sent all of its data. If the source link station is not waiting for a response or acknowledgment frame from the remote link station, then a reply timer Ti will generally not be started for the source link station. Rather, an inactivity timer Ti will be utilized, and if a frame is not received by the source link station before Ti expires, the source link station will again solicit the status of the other link station with a poll command to see if it is still on the network and to recover the link. The link recovery process, upon expiration of the Ti timer, will continue for a predetermined number of times (e.g., 8 to 10) after which the link station will be disconnected and declared inoperative if there is no reply to the numerous recovery polls. The inactivity timer Ti will generally be longer than reply timer Ti and might be 30 seconds, for example. The preferred embodiment of the present invention is directed to dynamically optimizing the IEEE 802.2 communication protocol by manipulating the timer expiry for the reply timers T1 and inactivity timers Ti, and by manipulating handling of the data to be transmitted upon T1 and Ti timer expiry in accordance with the various aspects of the present invention.

The IEEE 802.2 Type 2 network connection also utilizes a Receiver Acknowledgment Timer T2. A link between two link stations uses the receiver acknowledgment timer T2 to delay sending an acknowledgment for received frames in order to reduce unnecessary traffic on the network acknowledging every single frame from a source link station. As will be understood, any particular link station will be a source link station or remote/destination link station depending upon whether it is sending or receiving frames with respect to another link station. The link station will start the T2 timer when it receives a frame, such as a polling data frame, from a source link station. The T2 timer enables the remote link station to wait and see if additional frames are to follow after the first frame before it sends an acknowledgment that the frames were received. In that way, acknowledgment after every frame is avoided. The T2 timer is reset when the remote link station sends an acknowledgment to the source link station. If the T2 timer expires and the remote link station has not sent an acknowledgment, the remote link station will send an acknowledgment data frame as soon as possible. The T2 timer is generally a short timer and may be in the order of 0.1 seconds. The short duration of T2 is to ensure that data transmission occurs without any undue delays, and therefore, the receiver acknowledgment timer T2 will only create a slight wait period by the remote link station before it sends an acknowledgment. Accordingly, the IEEE 802.2 Type 2 connection utilizes the three timers, reply timer T1, inactivity timer Ti, and receiver acknowledgment timer T2 within the communications protocol. At least one timer will typically be running for every link.

Dynamic Optimization of IEEE 802.2 Communications Protocol

The protocol timers T1, Ti, and T2 associated with the IEEE 802.2 Type 2 connection protocol will be created, started, and handled differently with each different system associated with the link on the network. The timers will generally be started and handled by the LLC layer 64. A processor 21, as shown in FIG. 2, will run the LLC layer 64 for the protocol. For illustration of the invention, an internal timer scenario utilized by IBM Corporation, the Assignee of the present invention and application, will be described. It will be readily understood that other internal timer scenarios will be utilized depending upon the particular device linked to the network.

Figure 5:
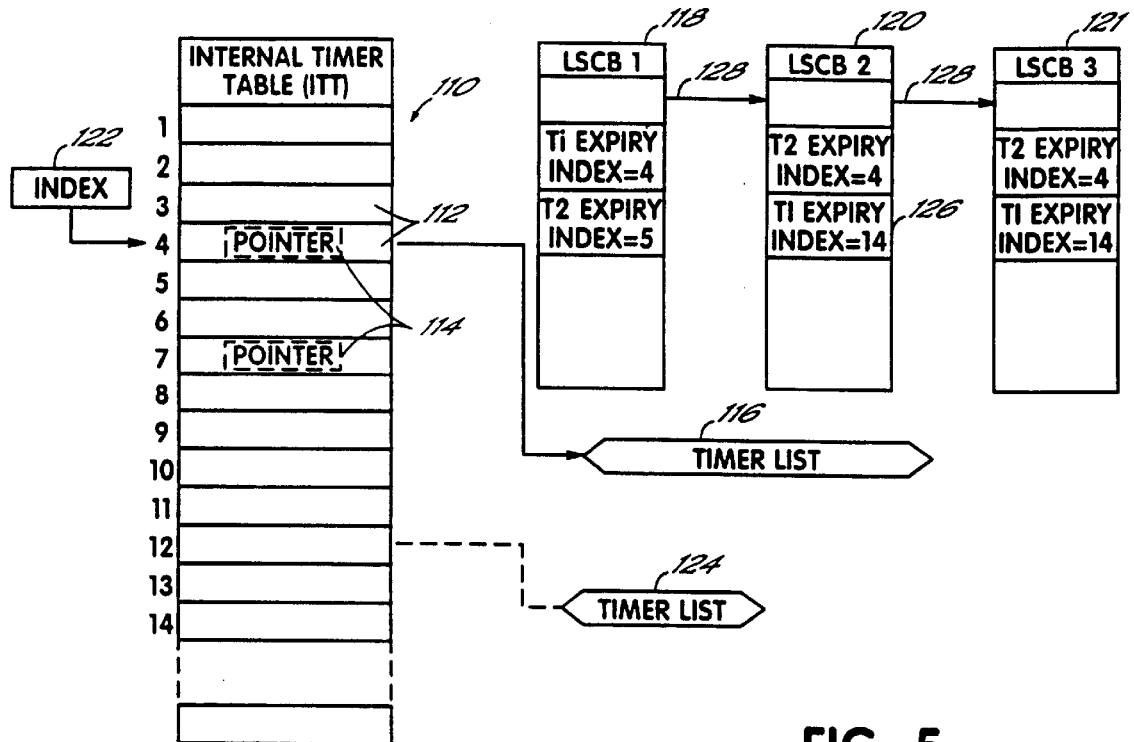
FIG. 5 is a schematic diagram of a timer table utilized in a fashion consistent with the present invention.

Referring to FIG. 5, the internal timer utilizes a timer service typically provided by the processor 21 and operating system of the network device, such as operating system 30 of device 20 (see FIG. 2) for starting and stopping a timer with a pre-defined resolution. For example, the system time resolution or segments provided by the system timer service might be 100 milliseconds or 0.1 second segments (ticks). All the internal timers, including T1, Ti, and T2 will be created and specified in terms of a number of system ticks to achieve the proper length for the timer. For example, T1 may be equal to 30 system ticks or 3 seconds (for a 100 msec. tick). There generally will be only one system timer utilized, regardless of the number of internal timers to be simulated for the IEEE 802.2 Type 2 protocol. The periodic timer will provide the necessary tick for signaling the 802.2 LLC every time that a period equal to the timer resolution has elapsed. In that way, timer expiry associated with a particular tick is noted by the IEEE 802.2 protocol.

As illustrated in FIG. 5, the internal timer for an IBM system utilizes an internal timer table 110 to keep track of the various timer events. The table, or ITT, has an entry 112 for each interval or tick of the timer, and each entry 112 may include a pointer 114 which points to a timer list 116 which has one or more timers expiring at that particular system tick. The timer list 116 will include blocks of code referred to as link station control blocks, or LSCBs, for the particular links having timers which expire on the system tick associated with the timer list. The LSCBs control operation of the link they are associated with. As illustrated in FIG. 5, a timer list 116 associated with tick number 4 of the ITT will be indexed and pointed to by a pointer 114 and may include LSCB1 118, LSCB2 120, and LSCB3 121, among others, which correspond to links having protocol timers which expire at system tick number 4. The ITT utilizes an index 122 to point to the current entry or system tick in the ITT. Every time the corresponding system timer ticks, the ITT index 122 is incremented to point to the next entry 112 in the ITT 110. Therefore, whenever the periodic system timer ticks and the ITT index 122 is incremented, the ITT index will always index the current ITT entry 112 which points to the timer list 116 of link station control blocks 118, 120, 121 (if any) which have internal protocol timers (e.g., T1, Ti, T2) which are set to expire at that instant or that system tick. Although each link may have multiple timers which are active concurrently; for example a link may have both a Ti and a T2 timer active, the link will only be linked to one timer list 116 at any particular time. That timer list will be the timer list associated with the earliest expiration of a timer associated with a particular link.

For example, referring to FIG. 5, LSCB1 corresponds to a link having a Ti timer expiring when the ITT index 122 is at ITT entry=4 (expiry index=4). However, the link associated with LSCB1 also includes a T2 timer set to expire when the ITT index is at system tick number 12 (expiry index or ITT entry=12). As discussed further hereinbelow, in accordance with one embodiment of the invention, the frames associated with the Ti timer will be transmitted on system tick 4, or expiry index=4, and then removed from timer list 116 associated with that system tick. Any remaining timers, such as the T2 timer, will be in an LSCB associated with the timer list 124 associated with system tick number 12.

When a timer is started, and the timer is set to expire upon a particular system tick or expiry index, the control block or LSCB associated with the link is then added to the head of any timer list which exists and is associated with that particular expiry index. When a timer is created or started, he expiry index for a particular timer is generated by adding the number of timer ticks to the current ITT index 122. For example, if a timer is started on system tick number 4 (ITT index=4), and is set to expire after 10 system ticks, the expiry index associated with the particular timer will equal 14 (Expiry index=14). The expiry index for a particular timer is then stored as an entry for that particular timer in the LSCB. in the appropriate timer list. The example just given of a timer, such as a T1 timer, having an expiry index equal to 14, is shown as an entry 126 for the LSCB 120 in timer list 116. Note that the LSCB 120 includes a T2 timer having an expiry index=4, and is therefore associated with a timer list 116 corresponding to an ITT index equal to 4. When the T2 timer expires on index equal 4, the LSCB 120 will then be associated with a timer list corresponding to index equal 14 for the T1 timer entry 126. As shown in FIG. 5, the various LSCBs associated with a particular timer list are linked together by paths 128 so that each of the timers and the frames associated therewith may be transmitted accordingly, in a sequential fashion.

The particular programs using IEEE 802.2 communications may also stop internal timers after they have been started. In accordance with the system as described and referenced to FIG. 5, when a timer has been stopped or cancelled, the LSCB associated with that timer will be deleted from the timer list 116 corresponding to the particular expiry index from the ITT. If any other timers still exist for the LSCB, notwithstanding the cancelled timer, the LSCB will be placed on another timer list corresponding to the earliest expiry index for the particular timers of that LSCB.

In accordance with one aspect of the present invention, to dynamically optimize an IEEE 802.2 Type II protocol, the timer expiries are monitored to determine the number of protocol timers which expire on the same system tick. Various of the timers are then adjusted when they are started to expire on subsequent system ticks so that the transmit queue is not overloaded on any particular system tick. In accordance with another aspect of the present invention, the status of the transmit queue is determined upon expiration of a protocol timer to determine whether data associated with that timer is to be processed. If the transmit queue is already in a full state, the frame processing associated with the timer is delayed until a subsequent system tick.

More particularly, with the first aspect of the present invention discussed above, FIG. 6 is a flow chart illustrating timer handling in a manner consistent with the invention. When a request is made within the IEEE 802.2 protocol to start a timer (block 150), a decision is made, as illustrated in block 152, to determine whether the timer to be started is a T2 timer. While a T2 timer may be dynamically manipulated in accordance with the aspects of the present invention, a preferred embodiment of the invention is directed to optimizing timer expiry associated with T1 and Ti protocol timers, but not the T2 protocol timer. The expiry of reply timer T1 and inactivity timer Ti drive the transmission of crucial command poll data frames, while the acknowledgment delay timer T2 expiry does not. Dynamically lengthening the T1 and Ti timers does not break the protocol, but lengthening the T2 timer could cause problems. For example, as discussed above, when a T2 timer times out, the link station must send an acknowledgment as soon as possible. If no acknowledgment is received, such as to a poll command frame, a T1 timer associated with the source link may expire without a reply. The link station will then send an additional poll data frame and start other T1 timers in sequential order. If the process continues for a length of time greater than the predetermined number of times, the link station may be disconnected. Therefore, it may not be desirable to indefinitely extend the T2 expiry. However, if a T2 timer is also to be dynamically optimized in accordance with the principles of the present invention, block 152 could be eliminated and block 154, discussed further hereinbelow, would be modified to refer to a count for all timers, rather than just non-T2 timers.

Figure 6:
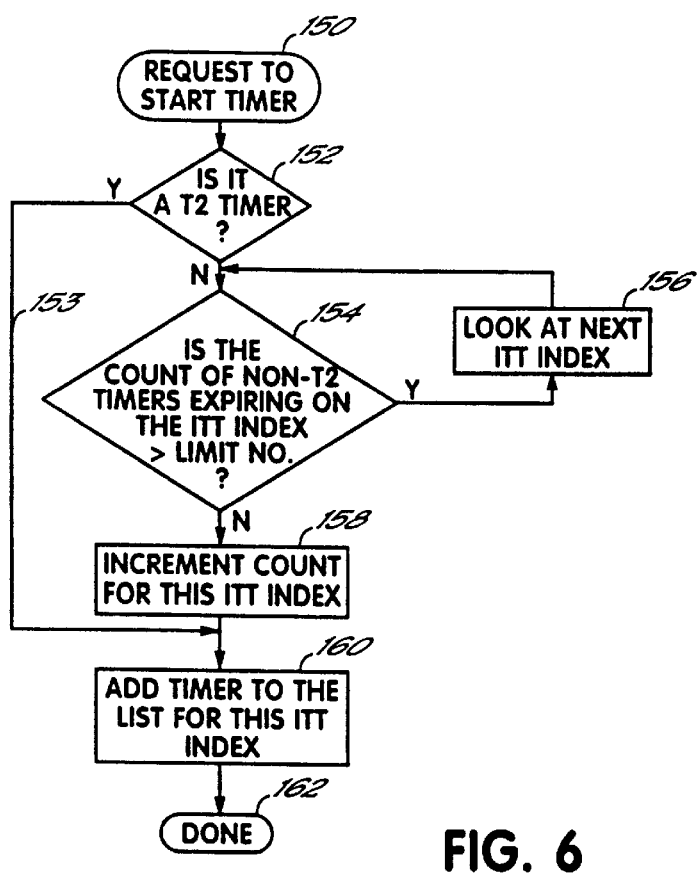
FIG. 6 is a software flowchart of one embodiment consistent with the present invention.
Figure 7:
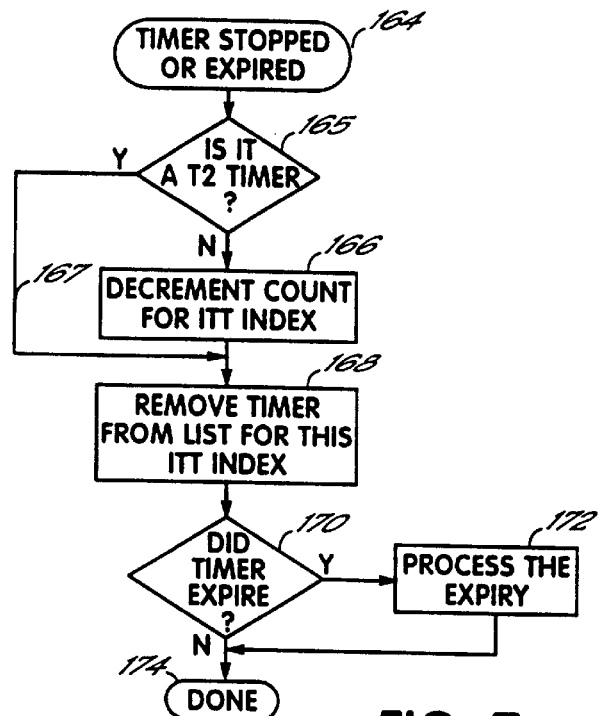
FIG. 7 is a software flowchart of one embodiment consistent with the present invention.

Referring to FIG. 6, with respect to one embodiment of the present invention, if the timer is a T2 timer, as indicated by path 153, the timer is added to the timer list for the particular ITT index on which the timer is to expire. Again, timers are defined by their particular expiry index rather than the current ITT index of the running system. If the timer to be started is not a T2 timer (i.e., T1 or Ti timer) it will be handled differently in accordance with one embodiment of the invention. A count is maintained corresponding to the number of timers expiring on the particular ITT expiry index associated with the timer being started. Of course, the count might also be maintained for all timers, including T2 timers as discussed above. The count is indicative of an actual number of scheduled protocol times. A timer limit number is also maintained by the timer expiry optimization code 61 consistent with the invention. The timer limit number will be determined by the maximum length or depth of the available transmit queue. When the count of the actual number of scheduled protocol timers expiring on the ITT expiry index of the timer to be started exceeds the timer limit number (Block 154), the next subsequent ITT expiry index is examined, as illustrated by Block 156. If the number of protocol timers expiring on that ITT expiry index count is less than the timer limit number, the count of the actual timer number for that index is incremented (Block 158) and the timer being started is added to the timer list for that particular ITT expiry index (Block 160). There is a count associated with each expiry index. However, if the number of timers as indicated by the count again exceeds the timer limit number, the next subsequent index is again examined (Block 156) to determine if that subsequent index has room for an additional timer. The loop between blocks 154 and 156 continues until an ITT expiry index is found with room for an additional timer. The count of the actual number of timers is then incremented (Block 158) and the timer is added to the respective timer list for the ITT expiry index (Block 160), and the process is completed, as illustrated by Block 162.

The count of the actual number of protocol timers associated with each ITT expiry index must be adjusted according to the expiration of a timer or a request to stop a particular timer which has already been started. That is, within the IEEE 802.2 protocol, not all timers which are started will be completed to their expiration. If a timer is stopped or expired, as indicated by Block 164, the count of the actual number of timers associated with a particular ITT index is decremented, according to Block 166.

As discussed above, in a preferred embodiment of the invention, the expiry of T2 timers is not dynamically optimized because of what may occur in the protocol if the T2 timer is lengthened indefinitely. Therefore, in accordance with one embodiment of the present invention, if timer selectivity is being utilized to only dynamically optimize T1 and Ti timers, then it must be determined whether the timer that is stopped or expired is or is not a T2 timer, as shown by Block 165. If the block is a T2 timer, and the count of the actual number of protocol timers which is being used is based only upon T1 and Ti timers, then the count will not be decremented and Block 166 will be skipped, as illustrated by path 167.

If the timer has stopped or expired, the timer is removed from the timer list for the particular ITT index according to Block 168. Block 168 is executed regardless of whether the timer expired or was stopped internally by the programs 62 and LLC 64. However, if the timer did expire, as determined by Block 170, then the expiration or expiry of the timer must be processed and the frames associated with the timer expiry are transmitted according to Block 172. The tasks associated with that timer are then completed (Block 174).

Figure 8:
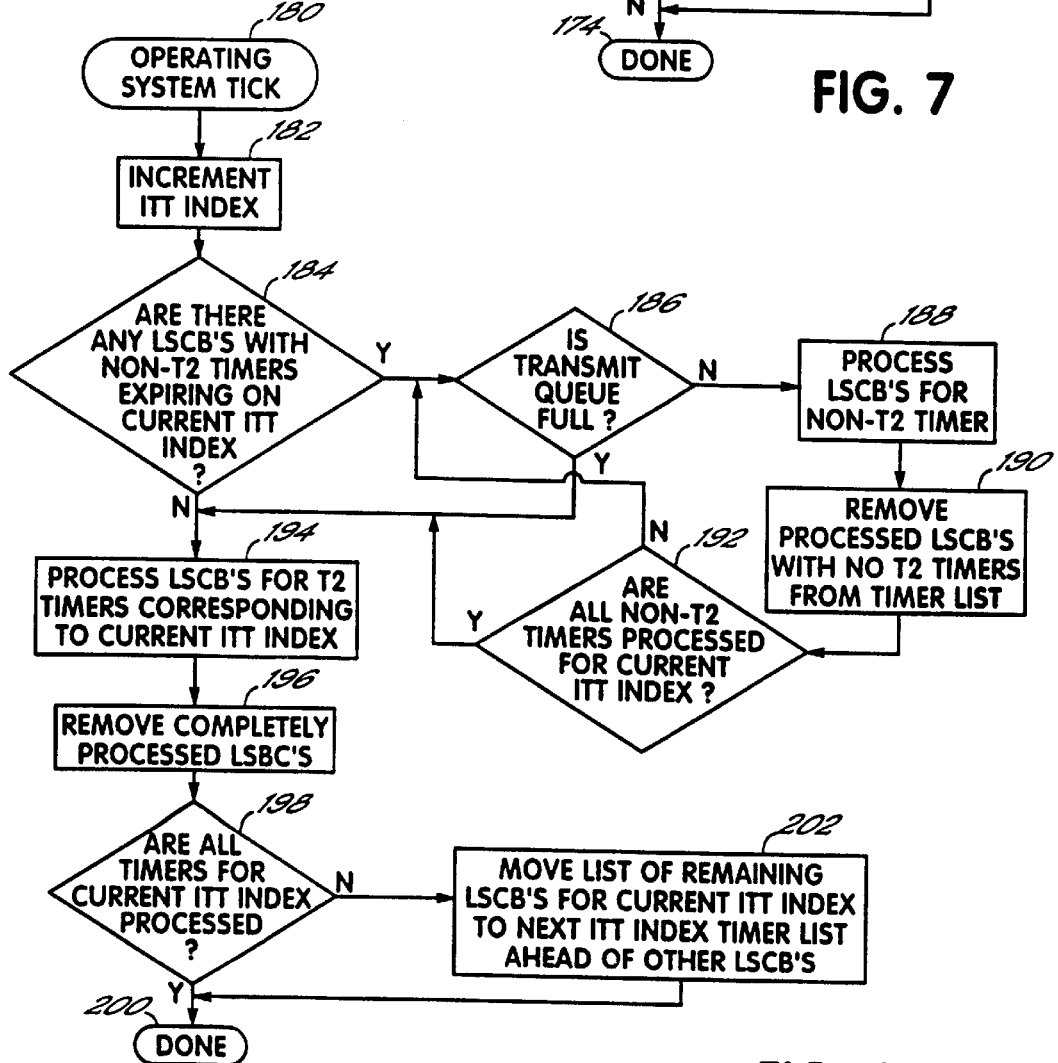
FIG. 8 is a software flowchart of one embodiment consistent with the present invention.

In accordance with another embodiment of the present invention, as illustrated in FIG. 8, the particular system tick on which a timer expires and the tick on which the data associated with the timer expiry is processed, is determined at expiry rather than when the timer is created as in the previously discussed embodiment. Specifically, upon a particular timer expiry, the transmit queue is checked and, if it is not in a full state, then the timer is processed. If the queue is in a full state, the timer is rescheduled to expire on a subsequent system tick, ahead of any other timers which might already exist with respect to that system tick or ITT Expiry Index. This aspect of the present invention provides a particularly efficient handling of the timers because it checks the actual fullness of the transmit queue upon timer expiry. The timer expiry optimization code depends upon the actual contents of the transmit queue rather than upon a count used to estimate the fullness of the queue based upon the number of timers expiring on a given tick.

Referring to FIG. 8, when an operating system tick occurs, as shown in Block 180, the corresponding ITT index is incremented (Block 182). For that particular ITT index, the timer list is referred to to determine if there are any LSCBs which have non-T2 timers expiring for that particular ITT index, according to Block 184. If such non-T2 timers exist, the status of the transmit queue is then checked according to Block 186 to determine if the transmit queue is in a full state. If it is not full, the LSCBs associated with the non-T2 timers are processed, as shown by Block 188. Those processed LSCBs that do not include any T2 timers are removed from the timer list associated with the current ITT index. That is, if all the non-T2 timers for a particular LSCB are processed, and the LSCB does not include any T2 timers, then the LSCB is removed from the timer list, according to Block 190. As indicated by Block 192 and the loop including Blocks 186, 188, 190, 192, the processing of the non-T2 timers continues until all such timers are processed for the current ITT index or the transmit queue is full. When the transmit queue becomes full, or is full upon the expiration of the first non-T2 timer to be processed, the non-T2 timers will not be processed for that particular ITT index. Instead, as indicated by Block 194, the LSCBs for any T2 timers corresponding to the current ITT index are then processed. Those LSCBs with completely processed timers (i.e., both T2 and non-T2) are removed, as indicated by Block 196. The T2 timers will be processed regardless of whether the transmit queue is full or not. As discussed above, it is actually better within the IEEE 802.2 protocol to let the T2 frames be dropped rather than indefinitely lengthen the T2 expiries and send those frames late. If all of the timers for the current ITT index are processed, according to Block 198, then the process is completed (Block 200). However, if any LSCBs remain for the current ITT index which have timer expiries corresponding to that index which have not been processed, those remaining LSCBs are moved to the next subsequent ITT index ahead of any other LSCBs on that subsequent timer list. For example, if one or more of the LSCBs includes a non-processed, non-T2 timer, those LSCBs are moved.

In accordance with one embodiment of the present invention, the LSCBs associated with T2 timers are all processed regardless of the status of the transmit queue. Therefore, any remaining LSCBs for a current ITT index will be T1 and Ti timers which will then be moved to the next ITT index timer list, ahead of the other LSCBs, according to Block 202. On the next system tick, the current ITT index is again incremented and the process starts all over, as shown by Blocks 180 and 182.

Figure 9:
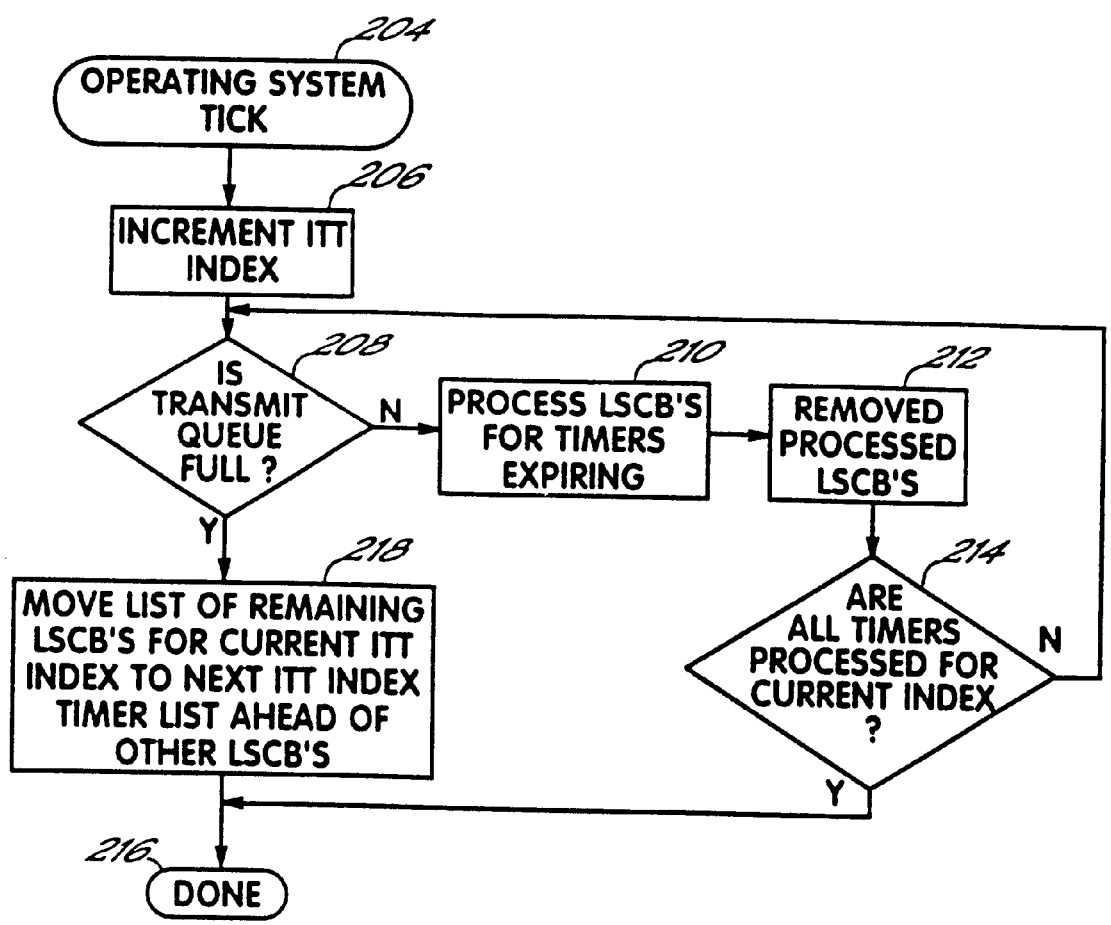
FIG. 9 is a software flowchart of one embodiment consistent with the present invention.

The program as illustrated in FIG. 8 may also be utilized for all timers and not just non-T2 timers. According to the program as illustrated by the flow chart in FIG. 9, consistent with one embodiment of the invention, an operating system tick occurs according to block 204. The ITT index is then incremented (Block 206). Regardless of whether the timers are T2 timers or non-T2 timers (i.e., T1, Ti timers), the condition of the transmit queue is checked to determine if it is full, as shown by Block 208. If it is not full, the LSCBs associated with the various timers expiring for that particular ITT index are processed (Block 210) and the processed LSCBs are then removed according to Block 212. As indicated by Block 214, the LSCBs for the expiring timers will continue to be processed until all the timers for the current ITT index have been processed. If all those timers are processed, and the transmit queue never reaches a full status, then the process is complete, as indicated by Block 216. However, if the transmit queue becomes full during processing of the various LSCBs associated with timer expiry, processing and data transmission associated with the particular ITT index ceases and the list of the remaining LSCBs with expiries corresponding to the current ITT index are removed to the next ITT index timer list ahead of any other LSCBs which currently exist on that timer list, according to Block 218. The next operating system tick occurs again and the ITT index is again incremented as shown in Blocks 204 and 206 and the process begins again. The process of FIG. 9 dynamically optimizes the expiry for all the timers associated with the IEEE 802.2 protocol for a Type 2 link connection.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for processing frames between links of a network using protocol timers which expire on operating system ticks, the method comprising:

when starting a protocol timer, determining an operating system tick corresponding to the expiration of the protocol timer;

determining an actual number of other protocol timers expiring on the same operating system tick and comparing the actual number to a timer limit number; and if the actual number exceeds the timer limit number, setting the current protocol timer to expire on a different operating system tick subsequent to the operating system tick on which it is originally set to expire.

2. The method of claim 1 further comprising:

determining the actual number of protocol timers expiring on the subsequent operating system tick; and if the actual number for expiring on the subsequent operating system tick exceeds the timer limit number, setting the current protocol timer to expire on still another subsequent operating system tick.

3. The method of claim 2 further comprising:

continuing to determine the actual number of protocol timers expiring on the another subsequent operating ticks; and setting the current protocol timer to expire on the first available operating system tick wherein the actual number of protocol timers expiring thereon is less than said timer limit number.

4. The method of claim 1 further comprising using a timer table with an index which is incremented through entries of the table to determine the actual number of other protocol timers expiring on an operating system tick.

5. The method of claim 4 wherein said index corresponds to an operating system tick.

6. The method of claim 4 wherein each table entry points to at least one timer list containing another timer set to expire on said same operating system tick.

7. The method of claim 1 further comprising maintaining a count for establishing said actual number of other protocol timers expiring on said same operating system tick.

8. The method of claim 1 wherein said protocol timers are IEEE 802.2 protocol timers, including T1, Ti, and T2 timers, the method further comprising:

before setting the current protocol timer to expire on a different operating system tick, determining if timer is a T2 timer; and if the timer is a T2 timer, letting it expire on original operating system tick.

9. The method of claim 7 further comprising:

decrementing said count when a timer expires for dynamically modifying the number of timers expiring on a particular operating system tick.

10. The method of claim 7 further comprising:

decrementing said count when a timer is cancelled for dynamically modifying the number of timers expiring on a particular operating system tick.

11. A method for processing frames between links of a network using protocol timers which expire on operating system ticks, the method comprising:

monitoring the expiration of a protocol timer and determining the corresponding operating system tick for the expiration;

upon expiration of the protocol timer, checking the depth of a transmit queue;

if the queue is not in a full state, processing frames associated with the protocol timer expiration on the corresponding operating system tick; and if the queue is in a full state, processing frames associated with the protocol timer expiration on a subsequent operating system tick.

12. The method of claim 11 further comprising processing frames associated with the protocol timer on the subsequent operating system tick ahead of other frames to be processed on that same subsequent operating system tick.

13. The method of claim 11 wherein said protocol timers are IEEE 802.2 protocol timers including T1, Ti, and T2 timers, the method further comprising:

determining if an expiring protocol timer is a T2 timer; and if it is a T2 timer, processing frames associated with the protocol timer expiration on the corresponding operating system tick regardless of the depth of the transmit queue.

14. The method of claim 13 further comprising:

determining all the protocol timers expiring on the corresponding operating system tick;

processing frames associated with one of the T1 and Ti timers; and subsequently processing frames associated with T2 timers.

15. A computer system comprising:

a data communications system operable for interfacing with a network and responsive to a protocol timer for processing frames over the network upon the expiration of the protocol timer on an operating system tick; and a processor, coupled to the communications system, the processor configured for monitoring the protocol timer to determine the operating system tick on which the protocol timer expires, the processor further configured to determine the actual number of other protocol timers expiring on the same operating system tick and, when said actual number of timers exceeds a timer limit number, setting the current protocol timer to expire on a different operating system tick subsequent to the original operating system tick on which it is originally set to expire.

16. The computer system of claim 15 wherein said processor is further configured to determine the number of protocol timers expiring on the subsequent operating system tick and, if the number of protocol timers expiring on the subsequent operating system tick exceeds the timer limit number, to set the protocol timer to expire on another subsequent operating system tick.

17. The computer system of claim 16 wherein the processor is further configured to continue to determine the number of protocol timers expiring on said another subsequent operating system ticks, and to set the protocol timer to expire on the first available operating system tick wherein the number of protocol timers expiring thereon is less than said timer limit number.

18. The computer system of claim 15 further comprising a timer table including an index which is incremented through entries of the table corresponding to protocol timers expiring on an operating system tick, the processor further configured to interface with the table to determine the actual number of protocol timers expiring on the same operating system tick.

19. The computer system of claim 15 wherein said processor is configured to maintain a count corresponding to said actual number of protocol timers expiring on the same operating system tick.

20. The computer system of claim 15 wherein said communications system includes an IEEE 802.2 protocol with protocol timers including T1, Ti and T2 timers, the processor further configured to determine if a timer is a T2 timer, and if it is, letting it expire on the original operating system tick.

21. A computer system comprising:

a data communications system operable for interfacing with a network and responsive to a protocol timer for processing frames on the network upon the expiration of the protocol timer on an operating system tick;

the data communications system including a transmit queue for receiving frames to be processed on the network upon the expiration of the protocol timer;

a processor, coupled to the communications system, the processor configured for monitoring the expiration of the protocol timer and for determining the operating system tick on which the protocol timer expires; and the processor further configured for checking, upon protocol timer expiration, the depth of the transmit queue, and if the queue is not in a full state, processing the frames associated with the protocol timer on the corresponding operating system tick, but if the queue is in a full state, processing the frames associated with the protocol timer on a subsequent operating system tick.

22. The computer system of claim 21 wherein said processor is configured for processing frames associated with the protocol timer on the subsequent operating system tick ahead of frames to be processed on that same subsequent operating system tick.

23. The computer system of claim 21 wherein said communications system includes an IEEE 802.2 protocol with protocol timers including T1, Ti, and T2 timers, the processor further configured to determine if a timer is a T2 timer, and if it is, processing frames associated with the protocol timer expiration on the corresponding operating system tick regardless of the depth of the transmit queue.

24. A program product, comprising:
(a) a program for interfacing with a communications system which establishes links between networked devices by utilizing protocol timers which expire on operating system ticks, the program configured to perform a method of managing the protocol timer expiries for supporting more links in the communications system, the method comprising:
  (1) when starting a protocol timer, determining an operating system tick corresponding to the expiration of the protocol timer;
  (2) determining an actual number of other protocol timers expiring on the same operating system tick and comparing the actual number to a timer limit number;
  (3) if the actual number exceeds the timer limit number, setting the current protocol timer to expire on a different operating system tick subsequent to the operating system tick on which it is originally set to expire; and
(b) a signal bearing media bearing the program.

25. A program product, comprising:
(a) a program for interfacing with a communications system which establishes links between networked devices by utilizing protocol timers which expire on operating system ticks, the program configured to perform a method of managing the protocol timer expiries for supporting more links in the communications system, the method comprising:
  (1) monitoring the expiration of a protocol timer and determining the corresponding operating system tick for the expiration;
  (2) upon expiration of the protocol timer, checking the depth of a transmit queue;
  (3) if the queue is not in a full state, processing frames associated with the protocol timer expiration on the corresponding operating system tick; and
  (4) if the queue is in a full state, processing the frames associated with the protocol timer expiration on a subsequent operating system tick; and
(b) a signal bearing media bearing the program.

* * * * *